United States Patent Office 3,803,203
Patented Apr. 9, 1974

3,803,203
α-(4-CYANO-4-ARYL-1-CYCLOHEXENYL)-
PROPIONIC ACIDS AND ESTERS
Michel Vincent, Bagneux, Georges Rédmond, Paris, and Jean-Claude Poignant, Wissous, France, assignors to Societe en nom Collectif Science Union et Cie
No Drawing. Filed Aug. 6, 1971, Ser. No. 169,840
Claims priority, application Great Britain, Aug. 13, 1970, 38,993/70
Int. Cl. C07c 121/64
U.S. Cl. 260—465 D         9 Claims

ABSTRACT OF THE DISCLOSURE

Arylcyclohexenyl compounds of the formula

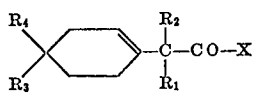

wherein $R_1$ is hydrogen or lower alkyl, $R_2$ is lower alkyl, $R_3$ is hydrogen, lower alkyl, phenyl, cyano or trifluoromethyl, $R_4$ is naphthyl, phenyl, halophenyl, lower-alkylphenyl, lower-alkoxy-phenyl, trifluoromethylphenyl, alkylenedioxyphenyl, or biphenylyl, and X is lower alkoxy, hydroxyl, amino, hydroxylamino, or ower-alkylamino.

These compounds possess anti-inflammatory, thrombolytic and/or fibrinolytic properties.

---

The present invention provides arylcyclohexenyl compounds of the General Formula I

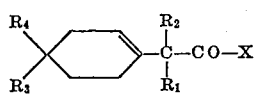 (I)

wherein:

$R_1$ is selected from the group consisting of a hydrogen atom and linear and branched lower alkyl radicals containing from 1 to 6 carbon atoms inclusive;
$R_2$ is selected from the group consisting of linear and branched lower alkyl radicals containing from 1 to 6 carbon atoms inclusive;
$R_3$ is selected from the group consisting of a hydrogen atom, linear and branched lower alkyl radicals containing from 1 to 6 carbon atoms inclusive, a phenyl radical, a cyano radical and a trifluoromethyl radical;
$R_4$ is selected from the group consisting of a naphthyl radical, an unsubstituted phenyl radical and phenyl radicals mono and poly substituted by: halogen atoms, linear and branched lower alkyl and lower alkoxy radicals each containing from 1 to 6 carbon atoms inclusive, trifluoromethyl radicals, alkylenedioxy radicals containing 1 and 2 carbon atoms, and phenyl radicals; and
X is selected from the group consisting of linear and branched lower alkoxy radicals containing from 1 to 6 carbon atoms inclusive, a hydroxyl radical, an amino radical, a hydroxylamino radical and a lower-alkylamino radical wherein the alkyl moiety has from 1 to 6 carbon atoms inclusive.

The new compounds of the General Formula I are prepared by submitting to the Reformatsky reaction a cyclohexanone of the General Formula II

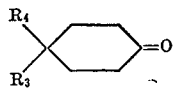 (II)

wherein $R_3$ and $R_4$ have the meanings given above, and an α-bromo ester of the General Formula III

 (III)

in which $R_1$ and $R_2$ have the meanings given above, and R represents a lower alkoxy radical containing from 1 to 6 carbon atoms inclusive in a linear or branched chain.

The resulting hydroxylated compound of the General Formula IV

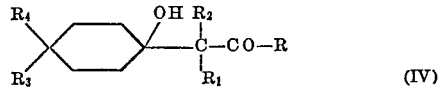 (IV)

wherein R, $R_1$, $R_2$, $R_3$ and $R_4$ have the meanings given above, is then dehydrated by a method known per se, for example, by the method described by G. A. R Kon and K. S. Nargund [cf. J. Chem. Soc., 2461 (1932)], to yield a compound of the General Formula I, wherein X is a lower alkoxy radical containing from 1 to 6 carbon atoms inclusive in a linear or branched chain. This last mentioned compound is then reacted with a compound of the General Formula HX, wherein X has the above defined meanings except a lower alkoxy radical, in order to obtain the other compounds of the General Formula I.

The starting cyclohexanones of the General Formula II are prepared by a method known per se, for example by one of the methods described by F. G. Bordwell et al. [cf. J. Amer. Chem. Soc., 89, 6704 (1967)] and E. C. Horning et al. [cf. J. Amer. Chem. Soc., 74, 173 (1952)].

The compounds of the General Formula I wherein X is a hydroxyl or a hydroxylamino radical, may be concerted into addition salts with mineral bases for example bases of alkali or alkaline earth metals, for example sodium, potassium or calcium hydroxide, carbonate or bicarbonate, or with organic bases, for example primary, secondary or tertiary amines, for example mono-, di- or triethylamine, alkanolamines, or dialkylamino alkanols.
The compounds of the General Formula I wherein X is a basic radical may be converted into addition salts with mineral or organic acids, for example hydrochloric, hydrobromic, sulphuric, phosphoric, acetic, propionic, maleic, tartric, citric, oxalic and benzoic acids. All these salts are included in the present invention.

Most of the compounds of the present invention contain one asymmetric carbon atom and may be resolved, by a method known per se, into optical isomers which are also included in the present invention.

The following examples illustrate the invention, the melting points being determined in a capillary tube, unless otherwise stated.

EXAMPLE 1

Ethyl α-(4-methyl-4-phenyl-1-cyclohexen-1-yl)-propionate

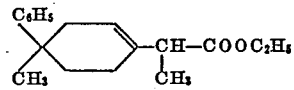

A ⅓ of a solution (a), containing 16.3 g. (0.09 mol) of ethyl α-bromopropionate, 16.9 g. (0.09 mol) of 4-methyl-4-phenyl-cyclohexanone, and 50 ml. of anhydrous benzene was added to 5.9 g. (0.09 mol) of zinc cuttings in the presence of some mercuric chloride crystals and an iodine crystal. The Reformatsky reaction was started with a slight heating and the remaining of the solution (a) was dropped into the reaction mixture maintained at the boiling point. The heating under reflux was maintained for three hours after the completion of the addition, then the reaction mixture cooled to the room temperature was poured on 77 g. of cracked ice and 49 ml. of acetic acid.

The benzenic layer was washed with an aqueous solution of sodium bicarbonate, then with distilled water until neutral. After drying on calcium sulphate and filtration, the solution was concentrated to dryness and the residue was distilled under vacuum. 17.4 g. of a mixture of ethyl α-(4-methyl-4-phenyl-1-hydroxy-cyclohexyl) - propionate cis and trans isomers were obtained (B.P./0.02 mm. Hg: 130–134° C., yield 67%).

A mixture comprising 17.4 g. (0.06 mol) of the above ester, 55 ml. of benzene and 106 g. (0.075 mol) of phosphoric anhydride was stirred at reflux for 4 hours. After pouring off the benzene layer was distilled under reduced pressure. 11.2 g. of ethyl α-(4-methyl-4-phenyl-1-cyclohexen-1-yl)-propionate were obtained. (B.P./0.005 mm. Hg: 117–119° C., yield 68.8%).

EXAMPLES 2–4

The following compounds were prepared according to the method described in Example 1:

(2) Ethyl α-(4-phenyl-1-cyclohexen-1-yl)-propionate, B.P./0.02 mm. Hg: 106–108° C., starting from crude ethyl α-(4-phenyl - 1 - hydroxy-cyclohexyl)-propionate, yield 61%, itself prepared from 4-phenyl-cyclohexanone and ethyl α-bromopropionate, yield 83.2%.

(3) Ethyl α-(4-cyano - 4 - orthochlorophenyl-1-cyclohexen-1-yl)-propionate, B.P./0.1 mm. Hg: 210–214° C., starting from crude ethyl α-(4-cyano-4-orthochlorophenyl-1-hydroxy-cyclohexyl)-propionate, yield: 37.8%, itself prepared from 4-cyano-4-orthochlorophenyl-cyclohexanone and ethyl α-bromopropionate, yield: 92.5% .

(4) Ethyl α-(4,4-diphenyl - 1 - cyclohexen-1-yl)-propionate, B.P./0.02 mm. Hg: 181–182° C., starting from crude ethyl α(4,4-diphenyl-1-hydroxy-cyclohexyl)-propionate, yield: 54.8%, itself prepared from 4,4-diphenyl-cyclohexanone and ethyl α-bromopropionate, yield: 91%.

EXAMPLE 5

α-(4-methyl-4-phenyl-1-cyclohexen-1-yl)-propionic acid

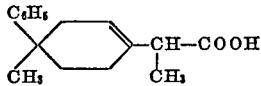

A solution of 11.2 g. (0.0413 mol) of ethyl α-(4-methyl-4-phenyl-1-cyclohexen-1-yl)-propionate prepared in Example 1, in 45.4 ml. of a N sodium hydroxide solution and 160 ml. of ethanol was heated at reflux for 4 hours. After concentration to dryness, the residue was dissolved into distilled water and the unsaponifiable products were extracted with n-pentane. The aqueous layer was acidified until pH 2.5 with 5 N HCl, and the precipitated acid was taken out with ether. The ethereal solution was washed with distilled water, dried on calcium sulphate, filtrated and concentrated to dryness. 8.5 g. of α-(4-methyl-4-phenyl-1-cyclohexen-1-yl)-propionic acid were obtained (yield: 84.5%). This product was purified by distillation (B.P./0.05 mm. Hg: 150–154° C., M.P. 52–54° C., yield of the purification: 70%).

EXAMPLES 6–30

The following compounds were prepared according to the method described in Example 5:

(6) α-(4-phenyl-1-cyclohexen - 1-yl)-propionic acid, M.P. 90–91° C., starting from ethyl α-(4-cyano-4-cyclohexen-1-yl)-propionate described in Example 2, yield 90%.

(7) α-(4-cyano-4-orthochlorophenyl - 1-cyclohexen-1-yl)-propionic acid, M.P. 136–140° C., starting from ethyl α-(4-cyano-4-orthochlorophenyl - 1 - cyclohexen-1-yl)-propionate described in Example 3, yield 78%.

(8) α-(4,4-diphenyl-1-cyclohexen - 1 - yl)-propionic acid, M.P. (Kofler) 126–127° C., starting from ethyl α-(4,4-diphenyl - 1 - cyclohexen-1-yl)-propionate described in Example 4, yield 90%.

(9) α-(4-orthochlorophenyl-1-cyclohexen - 1-yl)-propionic acid, M.P. 60–62° C., starting from ethyl α-(4-orthochlorophenyl-1-cyclohexen - 1-yl)-propionate, B.P./0.05 mm. Hg: 148–150° C., yield 92.5%, itself prepared from crude ethyl α-(4-orthochlorophenyl-1-hydroxy-cyclohexyl)-propionate, yield 50%, prepared from 4-orthochlorophenyl-cyclohexanone and ethyl α-bromopropionate, yied 82.5%.

(10) α-(4-paramethoxyphenyl - 1 - cyclohexen-1-yl)-propionic acid, M.P. (Kofler) 110–112° C., starting from ethyl α-(4-paramethoxyphenyl-1-cyclohexen - 1-yl)-propionate, B.P./0.3 mm. Hg: 178–184° C., yield 45%, itself prepared from crude ethyl α-(4-paramethoxyphenyl-1-hydroxy-cyclohexyl)-propionate, yield 77%, prepared from 4-paramethoxyphenyl-cyclohexanone and ethyl α-bromopropionate, yield 82.5%.

(11) α-[4-(3,4-methylenedioxyphenyl) - 1-cyclohexen-1-yl]-propionic acid, M.P. (Kofler) 130° C., starting from ethyl α-[4-(3,4 - methylenedioxyphenyl)-1-cyclohexen-1-yl]-propionate, B.P./0.04 mm. Hg: 170–180° C., yield 73.6%, itself prepared from crude ethyl α-[4-(3,4-methylenedioxyphenyl) - 1 - hydroxy-cyclohexyl)-propionate, yield 63%, prepared from 4-(3,4-methylenedioxyphenyl)-cyclohexanone and ethyl α-bromo-propionate, yield 100%.

(12) α-(4-parafluorophenyl - 1-cyclohexen-1-yl)-propionic acid, M.P. (Kofler) 110–112° C., starting from ethyl α-(4-parafluorophenyl-1 - cyclohexen-1-yl)-propionate, B.P.: 190–200° C., yield 64%, itself prepared from crude ethyl α-(4-parafluorophenyl-1 - hydroxy-cyclohexyl)-propionate, yield 48%, prepared from 4-parafluorophenylcyclohexanone and ethyl α-bromopropionate, yield 98%.

(13) α-(4-orthofluorophenyl-4-cyano - 1 - cyclohexen-1-yl)-propionic acid, M.P. (Kofler) 116–118° C., starting from ethyl α-(4-orthofluorophenyl-4-cyano-1-cyclohexen-1-yl)-propionate, B.P./0.05 mm. Hg: 180–200° C., yield 40%, itself prepared from crude ethyl α-(4-orthofluorophenyl - 4 - cyano - 1 - hydroxy-cyclohexyl)-propionate, yield 43%, prepared from 4-orthofluorophenyl-4-cyano-cyclohexanone and ethyl α-bromopropionate, yield 80.5%.

(14) α-[4-(1-naphtyl) - 4 - cyano-1-cyclohexen-1-yl]-propionic acid, M.P. (Kofler) 164–165° C., starting from ethyl α-[4-(1-naphthyl)-4-cyano - 1-cyclohexen-1-yl]-propionate, B.P./0.3 mm. Hg: 210–240° C., yield 41%, itself prepared from crude ethyl α-[4-(1-naphtyl)-4-cyano-1-hydroxy-cyclohexyl)-propionate, yield 44.5%, prepared from 4-(1-naphtyl)-4-cyano-cyclohexanone and ethyl α-bromopropionate, yield 93.5%.

(15) α-(4-parafluorophenyl - 4 - cyano-1-cyclohexen-1-yl)-propionic acid, M.P. (Kofler) 85° C., starting from ethyl α-(4-parafluorophenyl - 4 - cyano-1-cyclohexen-1-yl)-propionate, B.P./0.05 mm. Hg: 170–190° C., yield 34%, itself prepared from ethyl α-(4-parafluorophenyl-4-cyano-1 - hydroxy-cyclohexyl)-propionate, B.P./0.05 mm. Hg: 200° C., yield 64%, prepared from 4-parafluorophenyl-4-cyano-cyclohexanone and ethyl α-bromopropionate, yield 50.5%.

(16) α-(4-metachlorophenyl - 4 - cyano-1-cyclohexen-1-yl)-propionic acid, M.P. (Kofler) 90° C., starting from ethyl α-(4-metachlorophenyl - 4 - cyano-1-cyclohexen-1-yl)-propionate, B.P./0.1 mm. Hg: 200° C., yield 37.5%, itself prepared from crude ethyl α-(4-metachlorophenyl-4-cyano-1-hydroxy-cyclohexyl)-propionate, yield 47%, prepared from 4-metachlorophenyl - 4-cyano-cyclohexanone and ethyl α-bromopropionate, yield 99%.

(17) α-(4-phenyl-4-cyano - 1 - cyclohexen-1-yl)-propionic acid, M.P. (Kofler) 90–92° C., starting from ethyl α-(4-phenyl-4-cyano - 1 - cyclohexen-1-yl)-propionate, B.P./0.05 mm. Hg: 180–190° C., yield 35%, itself prepared from crude ethyl α-(4-phenyl-4-cyano-1-hydroxycyclohexyl)-propionate, yield 38%, prepared from 4-phenyl-4-cyano-cyclohexanone and ethyl α-bromopropionate, yield 97.5%.

(18) α-(4-orthotrifluoromethylphenyl - 4 - cyano-1-cyclohexen-1-yl)-propionic acid, M.P. (Kofler) 110–112° C., starting from ethyl α-(4-orthotrifluoromethylphenyl-4-cyano-1-cyclohexen-1-yl) - propionate, B.P./0.05 mm. Hg: 180–200° C., yield 34%, itself prepared from crude ethyl α-(4-orthotrifluoromethylphenyl - 4 - cyano-1-hydroxy-cyclohexyl)-propionate, yield 53%, prepared from 4-orthotrifluoromethylphenyl - 4 - cyano-cyclohexanone and ethyl α-bromopropionate, yield 94%.

(19) α-[4-(3,4-methylenedioxyphenyl)-4-methyl - 1-cyclohexen-1-yl]-propionic acid, M.P. (Kofler) 90° C., starting from ethyl α-[4-(3,4-methylenedioxphenyl)-4-methyl-1-cyclohexen - 1-yl]-propionate, B.P./0.05 mm. Hg: 175° C., yield 84.5%, itself prepared from crude ethyl α-[4-(3,4-methylenedioxyphenyl) - 4 - methyl-1-hydroxy-cyclohexyl]-propionate, yield 75%, prepared from 4-(3,4-methylenedioxyphenyl) - 4-methylcyclohexanone and ethyl α-bromopropionate, yield 99%.

(20) α-(4-paramethylphenyl-4-methyl - 1-cyclohexen-1-yl)-propionic acid, M.P. 51–53° C., starting from ethyl α-(4-paramethylphenyl - 4 - methyl-1-cyclohexen-1-yl)-propionate, B.P./0.05 mm. Hg: 138–140° C., yield 70%, itself prepared from crude ethyl α-(4-biphenyl-4-methyl-4-methyl-1-hydroxy-cyclohexyl)-propionate, yield 43.5%, prepared from 4-paramethylphenyl-4-methyl-cyclohexanone and ethyl α-bromopropionate, yield 96%.

(21) α-(4-biphenyl - 4 - methyl-1-cyclohexen-1-yl)-propionic acid, M.P. (Kofler) 118–119° C., starting from ethyl α-(4-biphenyl-4-methyl - 1 - cyclohexen-1-yl)-propionate, B.P./0.01 mm. Hg: 215–220° C., yield 74%, itself prepared from crude ethyl α-(4-biphenyl-4-methyl-1-hydroxy-cyclohexyl)-propionate, yield 66%, prepared from 4-biphenylyl-4-methyl-cyclohexanone and ethyl α-bromopropionate, yield 99%.

(22) α-[4-(1-naphthyl) - 4 - methyl-1-cyclohexen-1-yl]-propionic acid, M.P. 136–138° C., starting from ethyl α-[4-(1-naphthyl) - 4 - methyl-1-cyclohexen-1-yl]-propionate, B.P./0.05 mm. Hg: 198–200° C., yield 62%, itself prepared from crude ethyl α-[4-(1 - naphthyl)-4-methyl - 1 - hydroxy-cyclohexyl]-propionate, yield 50%, prepared from 4-(1-naphthyl)-4-methyl-cyclohexanone and ethyl α-bromopropionate, yield 95.5%.

(23) α-(4-paramethoxyphenyl - 4 - methyl-1-cyclohexen-1-yl)-propionic acid, isolated as a sodium salt, starting from ethyl α-(4-paramethoxyphenyl-4-methyl-1-cyclohexen-1-yl)-propionate, B.P./0.1 mm. Hg: 160° C., yield 76%, itself prepared from crude ethyl α-(4-paramethoxyphenyl - 4 - methyl-1-hydroxy-cyclohexyl) - propionate, yield 67%, prepared from 4-paramethoxyphenyl-4-methyl-cyclohexanone and ethyl α-bromopropionate, yield 93%.

(24) α-(4-biphenylyl - 4 - cyano - 1 - cyclohexen-1-yl)-propionic acid, M.P. (Kofler) 140–141° C., starting from ethyl α-(4-biphenylyl-4-cyano - 1 - cyclohexen-1-yl)-propionate, B.P./0.1 mm. Hg: 250° C., yield 34%, itself prepared from crude ethyl α-(4-biphenylyl-4-cyano-1-hydroxy - cyclohexyl) - propionate, yield 50.5%, prepared from 4-biphenylyl-4-cyano-cyclohexanone and ethyl α-bromopropionate, yield 100%.

(25) α-(4 - parachlorophenyl - 4 - cyano-1-cyclohexen-1-yl)-propionic acid, M.P. (Kofler) 119–120° C., starting from ethyl α-(4-parachlorophenyl-4-cyano-1-cyclohexen-1-yl)-propionate, B.P./0.05 mm. Hg: 200–218° C., yield 25%, itself prepared from crude ethyl α-(4-parachlorophenyl - 4 - cyano - 1 - hydroxy-cyclohexyl)-propionate, yield 43.5%, prepared from 4-parachlorophenyl-4-cyano-cyclohexanone and ethyl α-bromopropionate, yield 90%.

(26) α - (4 - paratrifluoromethylphenyl-1-cyclohexen-1-yl)-α-methyl propanoic acid, starting from ethyl α-(4-paratrifluoromethylphenyl - 1 - cyclohexen-1-yl)-α-methyl propanoate, itself prepared from ethyl α-(4-paratrifluoromethylphenyl - 1 - hydroxy-cyclohexyl)-α-methyl propanoate, prepared from 4-paratrifluoromethylphenyl-cyclohexanone and ethyl α-bromo-α-methyl propanoate.

(27) α-(4 - phenyl - 4 - trifluoromethyl-1-cyclohexen-1-yl)-α-methyl propanoic acid, starting from ethyl α-(4-phenyl - 4 - trifluoromethyl - 1 - cyclohexen-1-yl)-α-methyl propanoate, itself prepared from ethyl α-(4-phenyl-4-trifluoromethyl - 1 - hydroxy-cyclohexyl)-α-methyl propanoate, prepared from 4-phenyl-4-trifluoromethyl-cyclohexanone and ethyl α-bromo-α-methyl propanoate.

(28) α-(4 - phenyl - 1 - cyclohexen-1-yl)-propionamide, starting from ethyl α-(4-phenyl-1-cyclohexen-1-yl)-propionate, described in Example 2, and an ammoniacal solution in place of sodium hydroxide.

(29) N-methyl α-(4 - phenyl - 1 - cyclohexen-1-yl)-propionamide, starting from ethyl α-(4-phenyl-1-cyclohexen-1-yl)-propionate, described in Example 2, and a monomethylamine solution in place of sodium hydroxide.

(30) α-(4 - phenyl - 4 - methyl-1-cyclohexen-1-yl)-propionhydroxamic acid, starting from ethyl α-(4-phenyl-4-methyl-1-cyclohexen-1-yl)-propionate, described in Example 7, and a hydroxylamine solution in place of sodium hydroxide).

The compounds of the present invention and the physiologically tolerable addition salts thereof possess valuable pharmacological and therapeutic properties, especially anti-inflammatory, thrombolytic and/or fibrinolytic properties.

The toxicity of these compounds is weak. Their $LD_{50}$ in mice is between 500 and >1000 mg./kg. by oral route.

The anti-inflammatory activity was evidenced by the method of C. A. Winter et al. (Proc. Soc. Exp. Biol. Med., 3, 544, 1962) on the plantar edema of the rat's paw, induced by carrageenin. It was found that 40 to 80 mg./kg. of the new compounds administered per os decrease by 6 to 70% this type of inflammation. This same activity was demonstrated also on the ultraviolet ray-induced erythema, which is inhibited from 30 to 60% by 50 to 75 mg./kg. of the new compounds.

The thrombolytic activity was studied in vitro by the method of Von Kaulla (Thromb. Diath. Haem., 5, 489 1961) on the standard blod clot. Is was observed that the new compounds provoke the lysis of the blood clot at molar concentration of 0.01 to 0.007 corresponding to concentration of 0.01 to 0.007 corresponding to concentrations of 12.93 to 1.32 mg./ml. It was also observed that the new compounds possess fibrinolytic properties, decreasing, at doses of 10 to 100 mg./kg. per os, from 5 to 20% the euglobulin lysis time, 30 to 180 minutes after administration.

The low toxicity and the here-above described pharmacological properties allow the use of the compounds of the present invention in therapy, especially in the prevention and the treatment of inflammation, polyarthritis, rheumatisms and thromboembolic diseases.

The present invention also provides pharmaceutical compositions, containing a compound of General Formula I or a physiologically tolerable salt thereof in admixture or conjunction with a suitable pharmaceutical carrier, such, for example, as distilled water, glucose, lactose, talc, starch, magnesium stearate and cocoa-butter.

The pharmaceutical compositions may be in the form of tablets, dragées, capsules, suppositories or solutions for injection, in order to be administered by oral, rectal or parenteral route, at doses of 50 to 500 mg., 1 to 5 times a day.

What we claim is:
1. A compound selected from the group consisting of:
 (a) arylcyclohexenyl compounds of the formula

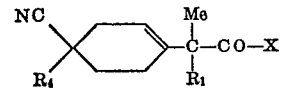

wherein:
 $R_1$ is hydrogen or methyl,
 $R_4$ is phenyl, halophenyl, biphenyl, trifluoromethylphenyl or naphthyl, and
 X is hydroxyl or ethoxy; and (b) physiologically tolerable addition salts with mineral or organic bases when X is hydroxyl.

2. A compound of claim 1 which is α-[4-(1-naphthyl)-4-cyano-1-cyclohexen-1-yl]-propionic acid.

3. A compound of claim 1 which is α-(4-orothofluorophenyl-4-cyano-1-cyclohexen-1-yl)-propionic acid.

4. α-(4-cyano - 4 - orthochlorophenyl-1-cyclohexen-1-yl)-propionic acid, according to claim 1.

5. α-(4 - metachlorophenyl - 4 - cyano-1-cyclohexen-1-yl)-propionic acid, according to claim 1.

6. α-(4-phenyl - 4 - cyano-1-cyclohexen-1-yl)-propionic acid, according to claim 1.

7. α-(4-orthotrifluoromethylphenyl - 4 - cyano-1-cyclohexen-1-yl)-propionic acid, according to claim 1.

8. α-(4 - biphenyl-4-cyano-1-cyclohexen-1-yl)-propionic acid, according to claim 1.

9. α-(4 - parachlorophenyl - 4 - cyano-1-cyclohexen-1-yl)-propionic acid, according to claim 1.

References Cited

UNITED STATES PATENTS 3,452,079   6/1969   Shen et al. _____ 260—465 X

LEWIS GOTTS, Primary Examiner

D. H. TORRENCE, Assistant Examiner

U.S. Cl. X.R.

260—469, 515 A, 515 R, 558 R; 424—304, 308, 317, 324